United States Patent
Kim et al.

(10) Patent No.: US 10,852,860 B2
(45) Date of Patent: Dec. 1, 2020

(54) TOUCH SENSOR HAVING ENHANCED DURABILITY AND OPTICAL CHARACTERISTICS AND METHOD OF MANUFACTURING THE SAME

(71) Applicant: DONGWOO FINE-CHEM CO., LTD., Iksan-si (KR)

(72) Inventors: Keon Kim, Gunpo-si (KR); Dong Pil Park, Incheon (KR); Yong Soo Park, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 90 days.

(21) Appl. No.: 15/869,435

(22) Filed: Jan. 12, 2018

(65) Prior Publication Data
US 2018/0196539 A1    Jul. 12, 2018

(30) Foreign Application Priority Data
Jan. 12, 2017  (KR) .................. 10-2017-0005086

(51) Int. Cl.
G06F 3/041 (2006.01)
G06F 3/044 (2006.01)

(52) U.S. Cl.
CPC .............. *G06F 3/041* (2013.01); *G06F 3/044* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2011/0141059 A1* | 6/2011 | Nashiki | ............... | G06F 3/044 345/174 |
| 2014/0106150 A1* | 4/2014 | Decker | ............... | C03C 17/34 428/216 |
| 2015/0241909 A1* | 8/2015 | Makino | ............... | G06F 3/041 345/173 |
| 2016/0299609 A1* | 10/2016 | Sugitani | ............... | H05K 3/06 |

FOREIGN PATENT DOCUMENTS

| | | |
|---|---|---|
| KR | 10-2006-0124940 | 12/2006 |
| KR | 10-2010-0118219 | 11/2010 |

* cited by examiner

*Primary Examiner* — Kenneth B Lee, Jr.
(74) *Attorney, Agent, or Firm* — DLA Piper LLP (US)

(57) ABSTRACT

The present invention relates to a touch sensor having enhanced durability and optical characteristics and a method of manufacturing the same. The method includes: supplying a touch sensor to an annealing chamber, the touch sensor including a base film and a touch sensor layer formed on the base film; and performing an annealing process on the touch sensor in the annealing chamber, wherein a thickness of a transparent electrode unit constituting the touch sensor layer ranges from about 35 nm to about 150 nm. According to the present invention, by optimizing the thickness and annealing conditions of the transparent electrode unit that affect the durability and optical characteristics of the touch sensor, flexibility and durability of the touch sensor can be simultaneously enhanced while minimizing degradation of the optical characteristics of the touch sensor.

3 Claims, 5 Drawing Sheets

TOUCH SENSOR HAVING ENHANCED DURABILITY AND OPTICAL CHARACTERISTICS AND METHOD OF MANUFACTURING THE SAME

CROSS-REFERENCE TO RELATED PATENT APPLICATION

This U.S. non-provisional patent application claims priority under 35 U.S.C. § 119 of Korean Patent Application No. 10-2017-0005086 filed on Jan. 12, 2017 in the Korean Patent Office, the entire contents of which are hereby incorporated by reference.

FIELD OF INVENTION

The present invention relates to a touch sensor having enhanced durability and optical characteristics. More particularly, the present invention relates to a touch sensor and a method of manufacturing the same, which, by optimizing a thickness and annealing conditions of a transparent electrode unit that affect durability and optical characteristics of the touch sensor, are capable of simultaneously enhancing flexibility and durability of the touch sensor while minimizing degradation of optical characteristics of the touch sensor.

BACKGROUND

Generally, a touch sensor is a device configured to detect a touch point in response to a touch when a user touches an image displayed on a screen with a finger or a touch pen.

The touch sensor is generally manufactured to cover a display device such as a liquid crystal display (LCD) and an organic light-emitting diode (OLED).

In recent years, research into flexible display devices and touch sensors, which can be made thinner, lighter, and bendable by using a polymer film instead of a glass substrate, has quickly progressed.

Meanwhile, a method of reducing the thickness of a transparent electrode, which is a component of the touch sensor, is being applied in the process of enhancing flexibility and optical characteristics of the touch sensor. However, according to this method, durability of the touch sensor may be degraded, causing cracks.

Conversely, there may be a method of increasing the thickness of a transparent electrode in order to enhance the durability of the touch sensor. However, this method leads to a problem of optical characteristics (e.g., a light transmittance) and flexibility of the touch sensor being degraded.

Prior-Art Documents (Patent Document 1) Korean Patent Publication No. 10-2010-0118219 (Publication Date: Nov. 5, 2010, Title: Flexible substrate for display panel and manufacturing method thereof)

(Patent Document 2) Korean Patent Publication No. 10-2006-0124940 (Publication Date: Dec. 6, 2006, Title: Method of manufacturing flexible display device)

SUMMARY OF THE INVENTION

Technical Problem

A technical objective of the present invention is to provide a touch sensor and a method of manufacturing the same that are capable of simultaneously enhancing durability and optical characteristics of the touch sensor.

Another technical objective of the present invention is to provide a touch sensor and a method of manufacturing the same that are capable of simultaneously enhancing flexibility and durability of the touch sensor while minimizing degradation of optical characteristics of the touch sensor by optimizing a thickness and annealing conditions of a transparent electrode unit that affect the durability and optical characteristics of the touch sensor.

Solution to Problem

A method of manufacturing a touch sensor having enhanced durability and optical characteristics includes: supplying a touch sensor to an annealing chamber, the touch sensor including a base film and a touch sensor layer formed on the base film; and performing an annealing process on the touch sensor in the annealing chamber, wherein a thickness of a transparent electrode unit constituting the touch sensor layer ranges from about 35 nm to about 150 nm.

In the method according to the present invention, after the performing of the annealing process, an elongation of the transparent electrode unit constituting the touch sensor layer may range from about 1.6% to about 7.0%.

In the method according to the present invention, the annealing process may be performed in a temperature range of about 70° C. to about 170° C.

In the method according to the present invention, the annealing process may be performed for a duration ranging from about 5 minutes to about 60 minutes.

In the method according to the present invention, a protective film may be formed on at least one exposed surface of an exposed surface of the base film and an exposed surface of the touch sensor layer.

In the method according to the present invention, the base film may have flexibility and the method according to the present invention may further include, before the supplying of the touch sensor, initially manufacturing the touch sensor by forming the touch sensor layer on a carrier substrate and transferring the touch sensor layer to the base film.

In the method according to the present invention, the initial manufacturing of the touch sensor may include: forming a separation layer on the carrier substrate; forming the touch sensor layer on the separation layer, the touch sensor layer including the transparent electrode unit; separating the carrier substrate to expose the separation layer; and bonding the base film to an exposed surface of the separation layer.

In the method according to the present invention, the initial manufacturing of the touch sensor further may include forming a first protective layer on the separation layer before the forming of the touch sensor layer and the touch sensor layer may be formed on the first protective layer during the forming of the touch sensor layer.

In the method according to the present invention, the first protective layer may be formed to cover all exposed surfaces including a side surface of the separation layer.

In the method according to the present invention, the initial manufacturing of the touch sensor may further include, after the forming of the touch sensor layer, forming a second protective layer on the touch sensor layer.

In the method according to the present invention, the initial manufacturing of the touch sensor may further include, after the bonding of the base film, forming a protective film on at least one exposed surface of an exposed surface of the base film and an exposed surface of the touch sensor layer.

In the method according to the present invention, the transparent electrode unit may include indium tin oxide (ITO).

In a touch sensor having enhanced durability and optical characteristics according to the present invention, an elongation of a transparent electrode unit constituting a touch sensor layer ranges from about 1.6% to about 7.0%.

The touch sensor according to the present invention may further include a base film formed on the touch sensor layer.

In the touch sensor according to the present invention, a thickness of the transparent electrode unit constituting the touch sensor layer may range from about 35 nm to about 150 nm.

The touch sensor according to the present invention may further include a separation layer formed between the base film and the touch sensor layer.

The touch sensor according to the present invention may further include a first protective layer formed between the separation layer and the touch sensor layer.

The touch sensor according to the present invention may further include a second protective layer formed on a surface opposite a surface of the touch sensor layer on which, from among both surfaces of the touch sensor layer the base film is formed.

In the touch sensor according to the present invention, the transparent electrode unit may include ITO.

Advantageous Effects

According to the present invention, there is an advantageous effect in that a method of manufacturing a touch sensor capable of simultaneously enhancing durability and optical characteristics of the touch sensor is provided.

In addition, there is an advantageous effect in that a method of manufacturing a touch sensor capable of simultaneously enhancing flexibility and durability of the touch sensor while minimizing degradation of optical characteristics of the touch sensor is provided by optimizing a thickness and annealing conditions of a transparent electrode unit that affects the durability and optical characteristics of the touch sensor.

DETAILED DESCRIPTION OF THE INVENTION

Figure 1:
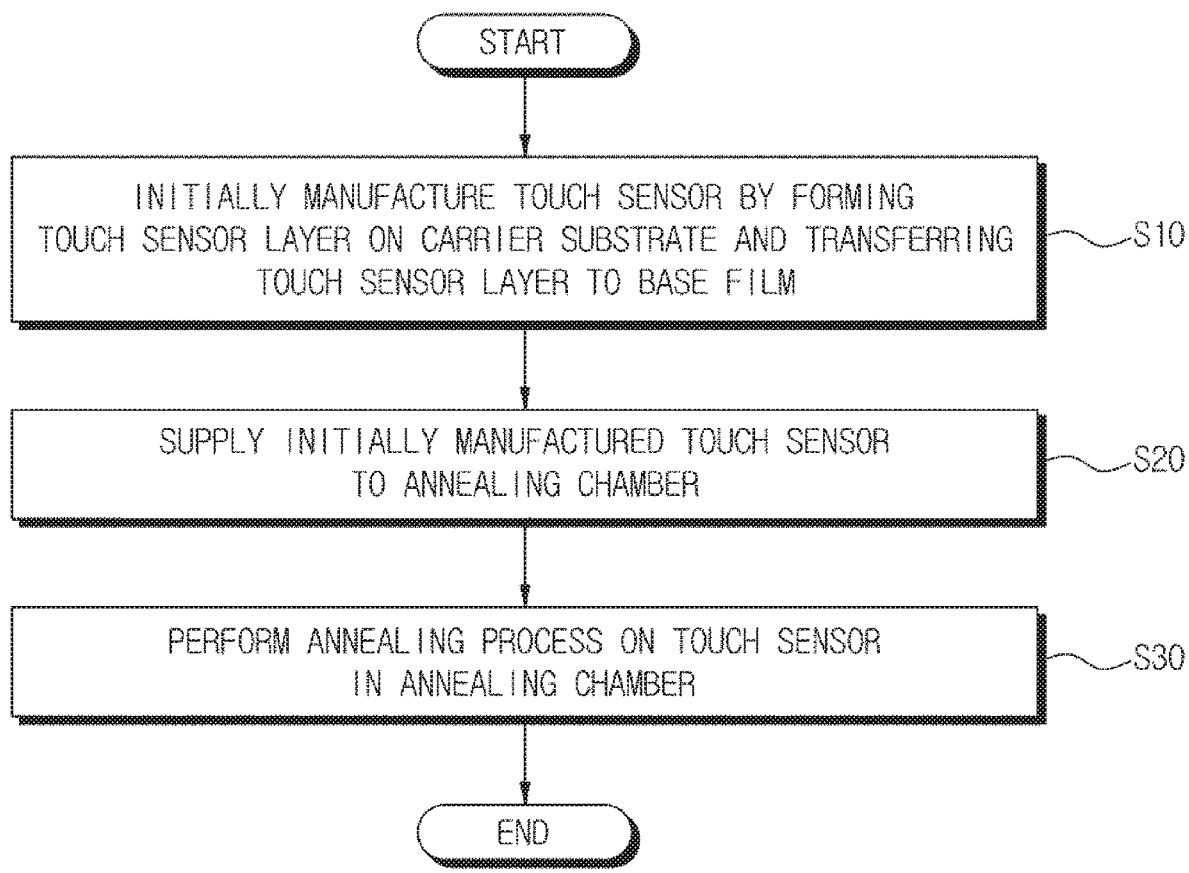
FIG. 1 is a process flowchart of a method of manufacturing a touch sensor having enhanced durability and optical characteristics according to an exemplary embodiment of the present invention.

As specific structural or functional descriptions for the embodiments according to the concept of the invention disclosed herein are merely exemplified for purposes of describing the embodiments according to the concept of the present invention, the embodiments according to the concept of the present invention may be embodied in various forms but are not limited to the embodiments described herein.

While the embodiments of the present invention are susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention.

It will be understood that, although the terms "first," "second," etc. may be used herein to describe various elements, the elements should not be limited by these terms. The terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, operations, elements, and/or components, but do not preclude the presence or addition of one or more other features, integers, operations, operations, elements, components, and/or groups thereof.

Unless otherwise defined, all terms (including technical and scientific terms) used herein have the same meaning as commonly understood by one of ordinary skill in the art to which this invention belongs. It will be further understood that terms such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings, in which exemplary embodiments of the present invention are shown.

FIG. 1 is a process flowchart of a method of manufacturing a touch sensor having enhanced durability and optical characteristics according to an exemplary embodiment of the present invention. FIGS. 2 to 12 are cross-sectional views for describing a method of manufacturing a touch sensor having enhanced durability and optical characteristics according to an exemplary embodiment of the present invention.

Referring to FIGS. 1 to 12, the method of manufacturing the touch sensor having enhanced durability and optical characteristics according to the exemplary embodiment of the present invention includes an initial touch sensor manufacturing operation (S10), a touch sensor supply operation (S20), and an annealing operation (S30).

In the initial touch sensor manufacturing operation (S10), a process of initially manufacturing the touch sensor may be performed by forming a touch sensor layer 40 on a carrier substrate 10 and transferring the touch sensor layer 40 to a base film having flexibility.

An example of a specific configuration of the initial touch sensor manufacturing operation (S10) will be described below.

As shown in FIGS. 2 to 11, the initial touch sensor manufacturing operation (S10) may include a separation layer forming operation, a first protective layer forming operation, a touch sensor layer forming operation, a second protective layer forming operation, carrier substrate separating operation, a base film bonding operation, and a protective film bonding operation.

Figure 2:
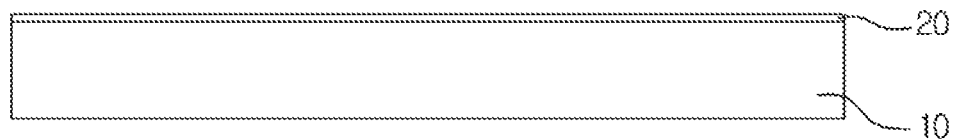
FIGS. 2 to 12 are cross-sectional views for describing a method of manufacturing a touch sensor having enhanced durability and optical characteristics according to an exemplary embodiment of the present invention.

To begin, referring to FIG. 2, in the separation layer forming operation, a process of forming a separation layer 20 on a carrier substrate 10 is performed.

The separation layer 20 is a functional layer formed to peel a touch sensor formed on the carrier substrate 10 from the carrier substrate 10 through a below-described process.

For example, a material of the separation layer 20 is not specifically limited when the separation layer 20 meets conditions for providing predetermined levels of peel force and transparency. For example, the separation layer 20 may include at least one material selected from the group consisting of a polyimide-based polymer, a poly vinyl alcohol-based polymer, a polyamic acid-based polymer, a polyamide-based polymer, a polyethylene-based polymer, a polystyrene-based polymer, a polynorbornene-based polymer, a phenylmaleimide copolymer-based polymer, a polyazobenzene-based polymer, a polyphenylenephthalamide-based polymer, a polyester-based polymer, a polymethyl methacrylate-based polymer, a polyarylate-based polymer, a cinnamate-based polymer, a coumarin-based polymer, a phthalimidine-based polymer, a chalcone-based polymer, and an aromatic acetylene polymer.

Although the peel force of the separation layer 20 is not specifically limited, the peel force of the separation layer 20 may be, for example, in a range of about 0.001 mm to about 1N/25 mm, and preferably, in a range of about 0.005 mm to about 0.2N/25 mm. When the range is satisfied, during the process of manufacturing the touch sensor, the separation layer 20 may be easily peeled from the carrier substrate 10 without residue, and curls and cracks caused by tension generated during the peeling may be reduced.

Although a thickness of the separation layer 20 is not specifically limited, for example, the thickness of the separation layer 20 may range from about 10 nm to about 1000 nm, and preferably, about 50 nm to about 500 nm. When the range is satisfied, the peel force may be stabilized, and a uniform pattern may be formed.

Figure 3:
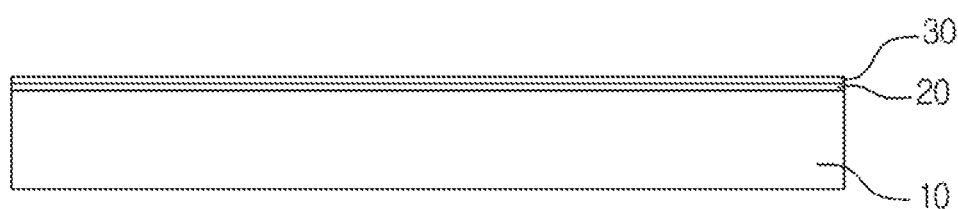

Referring additionally to FIG. 3, in the first protective layer forming operation, a process of forming a first protective layer 30 on the separation layer 20 is performed.

The touch sensor layer 40 is coated with and protected by the first protective layer 30. In the touch sensor forming operation, the first protective layer 30 functions to prevent the separation layer 20 from being exposed to an etchant for forming the touch sensor layer 40. The first protective layer 30 is an optional component that may be omitted as needed.

For example, the first protective layer 30 may be formed to cover at least a partial region of a side surface of the separation layer 20. The side surface of the separation layer 20 is an edge sidewall of the separation layer 20. Due to this configuration, the side surface of the separation layer 20 may be prevented from being exposed to the etchant during a process of patterning conductive sensing patterns (i.e., a transparent electrode unit 41 and 42) included in the touch sensor layer 40. With respect to completely shielding the side surface of the separation layer 20, the first protective layer 30 may be configured to cover the entire side surface of the separation layer 20.

With respect to a material of the first protective layer 30, any polymers known in the art may be used without limitation, for example, an organic insulating film. Among these, the first protective layer 30 may be formed of a curing composite including polyol and a melamine curing agent, but is not limited thereto.

Specific kinds of polyol may include polyether glycol derivatives, polyester glycol derivatives, and polycaprolactone glycol derivatives, but are not limited thereto.

Specific kinds of the melamine curing agent may include methoxy methyl melamine derivatives, methyl melamine derivatives, butyl melamine derivatives, isobutoxy melamine derivatives, and butoxy melamine derivatives, but are not limited thereto.

In another example, the first protective layer 30 may be formed of an organic/inorganic hybrid curing composite. When an organic compound and an inorganic compound are simultaneously used, cracks may be reduced during the peeling.

The above-described components may be used as the organic compound, and the inorganic compound may be, but is not limited to, silica-based nanoparticles, silicon-based nanoparticles, and glass nanofibers.

In the touch sensor layer forming operation, a process of forming the touch sensor layer 40 is performed on the first protective layer 30.

The touch sensor layer 40 is a component configured to sense a touch signal input by a user.

For example, sensing patterns included in the touch sensor layer 40 may be formed in an appropriate shape according to the requirements of an electronic device to which the touch sensor is applied. For example, when the touch sensor is used in a touch screen panel, the sensing patterns may be formed as two types of patterns, that is, a pattern configured to sense an x coordinate and a pattern configured to sense a y coordinate, but are not limited thereto.

An example of a specific configuration of the touch sensor layer forming operation will be described with additional reference to FIGS. 4 to 6.

Figure 4:
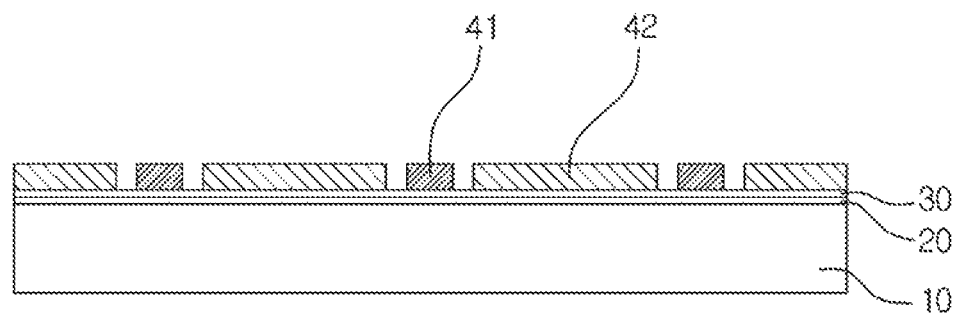

To begin, referring additionally to FIG. 4, a process of forming first sensing patterns 41, which are connected to each other in a first direction, and second sensing patterns 42, which are separated from each other in a second direction intersecting the first direction, is performed. For example, when the first direction is an X direction, the second direction may be a Y direction. The first sensing patterns 41 and the second sensing patterns 42 constitute a transparent electrode unit.

Figure 5:
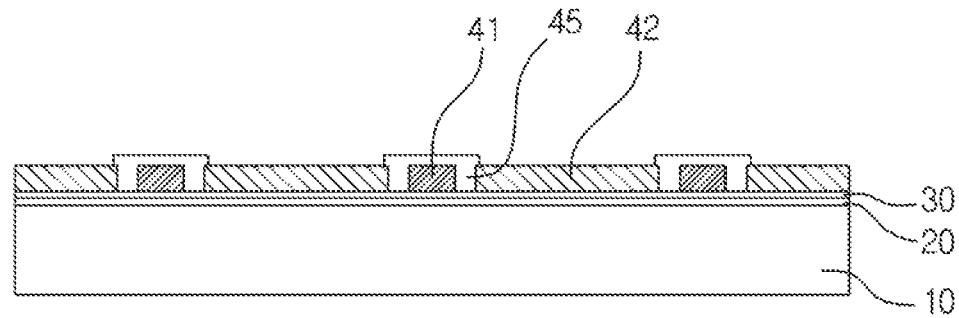

Next, referring additionally to FIG. 5, a process of forming an insulating layer 45 between the first sensing patterns 41 and the second sensing patterns 42 is performed.

The insulating layer 45 electrically insulates the first sensing patterns 41 from the second sensing patterns 42.

Figure 6:
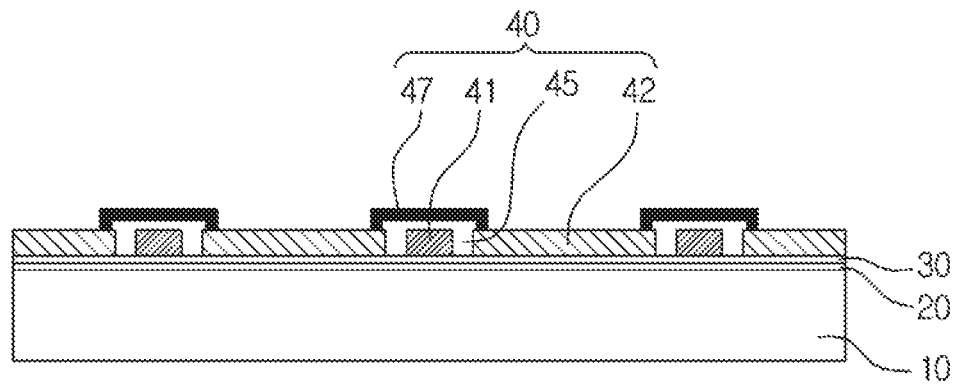

Next, referring additionally to FIG. 6, a process of forming connection patterns 47 is performed to electrically connect adjacent second sensing patterns 42.

With respect to materials of the first sensing patterns 41, the second sensing patterns 42, and the connection patterns 47, any transparent conductive material may be used without limitation. For example, the materials may be selected from among: metal oxides selected from the group including indium tin oxide (ITO), indium zinc oxide (IZO), indium zinc tin oxide (IZTO), aluminum zinc oxide (AZO), gallium zinc oxide (GZO), fluorine tin oxide (FTO), indium tin oxide-Ag-indium tin oxide (ITO-Ag-ITO), indium zinc oxide-Ag-indium zinc oxide (IZO-Ag-IZO), indium zinc tin oxide-Ag-indium zinc tin oxide (IZTO-Ag-IZTO), and aluminum zinc oxide-Ag-aluminum zinc oxide (AZO-Ag-AZO); metals selected from the group including gold (Au), silver (Ag), copper (Cu), molybdenum (Mo), and APC; nano wires made of a metal selected from the group including gold, silver, copper, and lead; carbon based materials selected from the group including carbon nano tube (CNT) and graphene; and conductive polymer materials selected from the group including poly(3,4-ethylenedioxitiophene) (PEDOT) and polyaniline (PANI), and the materials may be used individually or in a mixture of two or more thereof, and preferably, ITO may be used. Both a crystalline and a non-crystalline ITO may be used.

The transparent electrode unit 41 and 42 constituting the touch sensor layer 40, that is, the first sensing patterns 41 and the second sensing patterns 42, may be configured to have a thickness of about 35 nm to about 150 nm. Due to this configuration, a touch sensor that is a final resultant structure of the manufacturing process can obtain durability and simultaneously maintain optimum optical characteristics.

For example, the first sensing patterns 41 and the second sensing patterns 42 constituting the touch sensor layer 40 may be polygonal patterns that are independent of one another, such as triangular patterns, tetragonal patterns, pentagonal patterns, hexagonal patterns, heptagonal patterns, or patterns of shapes with even more angles.

In addition, for example, the touch sensor layer 40 may include regular patterns. The regular patterns refer to patterns having a shape with regularity. For example, the sensing patterns may include rectangular or square mesh-shaped patterns or hexagonal patterns, which are independent of one another. By configuring the sensing patterns of the touch sensor layer 40 in a mesh shape, degradation of visibility caused by the sensing patterns may be prevented.

Furthermore, for example, the touch sensor layer 40 may include irregular patterns. The irregular patterns refer to patterns having an irregular shape.

In addition, for example, when the sensing patterns constituting the touch sensor layer 40 is formed of a material such as metal nanowires, carbon-based materials, or polymer materials, the sensing patterns may have a network structure. When the sensing patterns have the network structure, since a signal is sequentially transmitted to adjacent patterns contacting one another, patterns having a high sensitivity may be formed.

For example, the sensing patterns constituting the touch sensor layer 40 may be formed to have a mono-layered structure or a multilayered structure.

With respect to a material of the insulating layer 45 configured to electrically insulate the first sensing patterns 41 from the second sensing patterns 42, any insulating material known in the art may be used without limitation. For example, metal oxides like silicon oxides, photosensitive resin composites containing acrylic resins, or thermoplastic resin composites may be used. Alternatively, the insulating layer 45 may be formed using an inorganic material such as silicon oxide (SiOx). In this case, the insulating layer 45 may be formed using a method such as a deposition process or a sputtering process.

Figure 7:
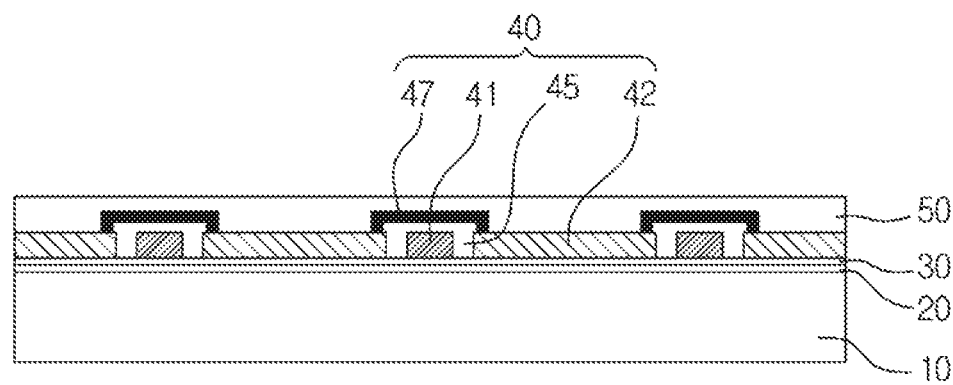

Referring additionally to FIG. 7, in the second protective layer forming operation, a process of forming a second protective layer 50 to cover the first sensing patterns 41, the second sensing patterns 42, the insulating layer 45, and the connection patterns 47 of the touch sensor layer 40 is performed.

For example, the second protective layer 50 may be formed of an insulating material and functions to electrically insulate the touch sensor layer 40 from the outside and protect the touch sensor layer 40.

For example, a side opposite a surface of the second protective layer 50 in contact with the touch sensor layer 40 may be planarized.

Further, for example, the second protective layer 50 may be formed to have a mono-layered structure or a multilayered structure including at least two layers.

For example, with respect to a material of the second protective layer 50, any insulating material known in the art may be used without limitation, and more preferably, a heat-resistant material that is not deformed or less deformed in the annealing operation (S30) may be used. For example, metal oxides like silicon oxides, photosensitive resin composites containing acrylic resins, or thermoplastic resin composites may be used. Alternatively, the second protective layer 50 may be formed using an inorganic material such as silicon oxides (SiOx) and, in this case, may be formed using a method such as a deposition process or a sputtering process.

Figure 8:
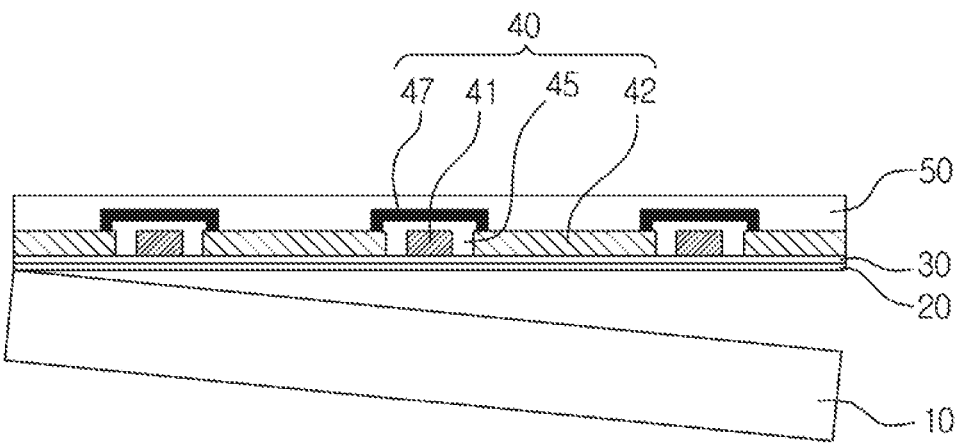

Referring additionally to FIG. 8, in the carrier substrate separating operation, a process of exposing the separation layer 20 by peeling the carrier substrate 10 from the separation layer 20 by using physical force is performed.

Figure 9:
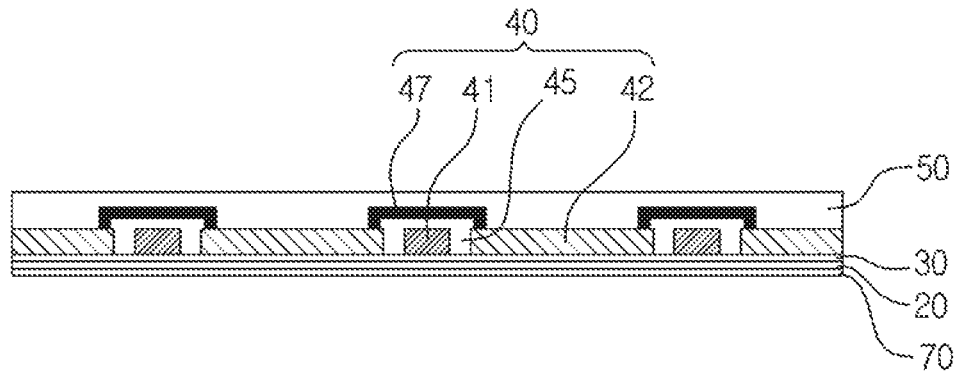

Referring additionally to FIG. 9, a process of forming an adhesive layer 70 is performed on an exposed surface of the separation layer 20.

For example, a light-curing adhesive, an aqueous adhesive, or an organic adhesive may be used as a material of the adhesive layer 70, but is not limited thereto.

The light-curing adhesive is an adhesive that is cured when irradiated with light such as ultraviolet (UV) light. Since the light-curing adhesive does not need an additional drying process after a light-curing process, a manufacturing process is simplified, thus improving productivity.

For example, with respect to the light-curing adhesive, a radical polymerization type having acrylate or unsaturated polyester as a main component and a cationic polymerization type having epoxy, oxetane, or vinyl ether as a main component may be used.

Figure 10:
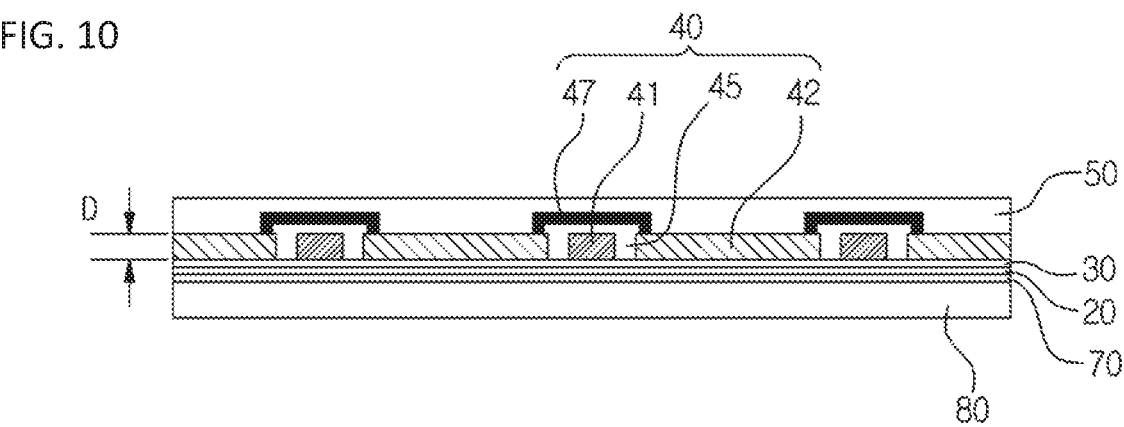

Referring additionally to FIG. 10, in the base film bonding operation, a process of bonding a base film 80 to the adhesive layer 70 is performed. For example, the base film 80 may be a transparent optical film or a polarizing plate.

The transparent optical film may use a film having transparency, mechanical strength, and good thermal stability, and more preferably, may use a heat-resistant material that is not deformed or less deformed in the annealing operation (S30). Specific examples of the transparent optical film may include a film formed of a thermoplastic resin, for example, a polyester-based resin such as polyethylene terephthalate, polyethylene isophthalate, polyethylene naphthalate, and polybutylene terephthalate; a cellulose-based resin such as diacetylcellulose and triacetylcellulose; polycarbonate-based resins; acrylic resins such as polymethyl (meth) acrylate and polyethyl (meth)acrylate; a styrene resin such as polystyrene and acrylonitrile-styrene copolymers; a polyolefin-based resin such as polyethylene, polypropylene, cyclo-based or norbornene-structured polyolefins, and an ethylene-propylene copolymer; a vinyl chloride resin; an amide-based resin such as nylon and aromatic polyamide; an imide-based resin; a polyether sulfone-based resin; a sulfone-based resin; a polyether ether ketone-based resin; a sulfided polyphenylene-based resin; a vinyl alcohol-based resin; a vinylidene chloride-based resin; a vinyl butyral-based resin; an allylate-based resin; a polyoxymethylene-based resin; or an epoxy-based resin, or include a film including a blend of the thermoplastic resin. Further, a film formed of a thermosetting resin such as a (meth)acrylic resin, a urethane-based resin, an acrylic urethane-based resin, an epoxy-based resin, or a silicone-based resin, or a UV-curable resin may be used.

An appropriate thickness of the transparent optical film may be chosen, but a typical thickness may be of about 1 μm to about 500 μm may be chosen in consideration of workability characteristics such as strength and handleability, and thin-layer characteristics. In particular, the thickness of the transparent optical film may preferably be in a range of about 1 μm to 300 μm and more preferably in a range of about 5 μm to about 200 μm.

The transparent optical film may contain at least one appropriate additive. Examples of the additive may include, for example, a UV absorber, an antioxidant, a lubricant, a plasticizer, a release agent, a coloring inhibitor, a flame retardant, a nucleating agent, an antistatic agent, a pigment, and a coloring agent. The transparent optical film may have a structure including, on one surface or both surfaces of a film, various functional layers such as a hard coating layer, an anti-reflective layer, and a gas barrier layer. The functional layers are not limited to the above-described examples, but the transparent optical film may include various functional layers according to purpose.

Further, when necessary, the transparent optical film may be surface-treated. Examples of the surface treatment may include chemical treatments, for example, a plasma treatment, a corona treatment, a dry treatment such as a primer treatment, and an alkali treatment including a saponification treatment.

In addition, the transparent optical film may be an isotropic film or a phase-contrast film.

In the case of the isotropic film, an in-plane retardation (Ro, Ro=[(nx−ny)×d], nx and ny are main refractive indices in a film surface, and d is a thickness of a film) is about 40 nm or less, and preferably about 15 nm or less, and a thickness retardation (Rth, Rth=[(nx+ny)/2−nz]×d, nx and ny are the main refractive indices, nz is a refractive index in a thickness direction of the film, and d is the thickness of the film) is in a range of about −90 nm to about +75 nm, preferably about −80 nm to +60 nm, and particularly about −70 nm to about +45 nm.

The phase-contrast film is manufactured by performing a uniaxial stretching method, a biaxial stretching method, a polymer coating method, or a liquid coating method on a polymer film. In general, the phase-contrast film is used for improving and adjusting optical characteristics, for example, compensating a viewing angle, improving color, redressing light leakage, and adjusting color tone. Types of the phase-contrast film include a ½ or ¼ wave plate, a positive C plate, a negative C plate, a positive A plate, a negative A plate, and a biaxial wave plate.

The polarizing plate may be a known polarizing plate used for a display panel. Specifically, the polarizing plate may be, but is not limited to, a plate obtained by installing a protective layer on at least one surface of a polarizer formed by stretching a polyvinyl alcohol film to dye iodine or a dichroic pigment, a plate obtained by orienting liquid crystals to act as a polarizer, or a plate obtained by coating a transparent film with an orientation resin such as polyvinyl alcohol and stretching and dying the coated transparent film.

Figure 11:
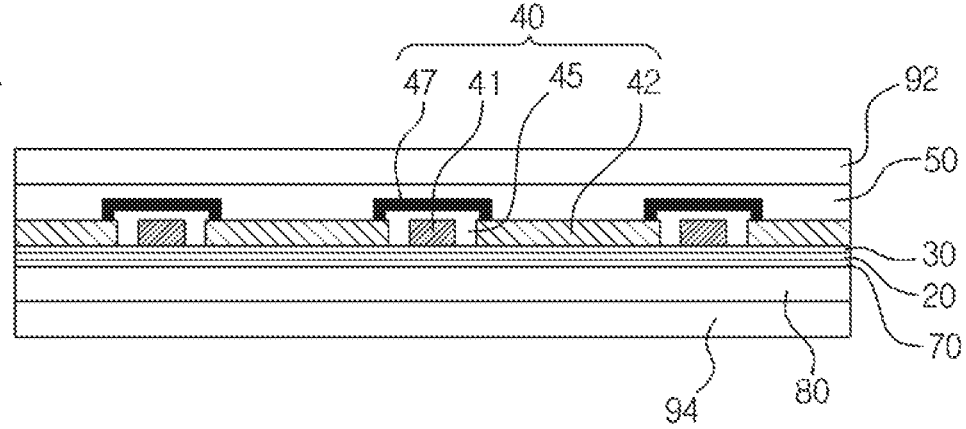

Referring additionally to FIG. 11, in the protective film forming operation, a process of forming protective films 92 and 94 on at least one exposed surface of an exposed surface the base film and an exposed surface of the touch sensor layer 40 is performed. The protective films 92 and 94 prevent the base film 80 and the touch sensor layer 40 constituting the touch sensor from being directly exposed to an annealing environment in the annealing operation (S30), which will be described below, and inhibit irregular shrinkage of the base film 80 and the touch sensor layer 40.

In the touch sensor supply operation (S20), a process of supplying the touch sensor including the base film 80 and the touch sensor layer 40 formed on the base film 80 into an annealing chamber is performed.

In the annealing operation (S30), a process of annealing the touch sensor in the annealing chamber is performed. After the annealing operation (S30) that will be described below is performed, since the transparent electrode unit 41 and 42 constituting the touch sensor layer 40 will have shrunken to a specific level in advance so as to increase elongation. Accordingly, even when external force is applied to the touch sensor during a subsequent process for the touch sensor or in an environment in which the touch sensor is used, the transparent electrode unit 41 and 42 constituting the touch sensor layer 40 remains flexible due to the increased elongation. Thus, the transparent electrode unit 41 and 42 constituting the touch sensor layer 40 has an improved durability of crack in response to the external force.

For example, a thickness D of the transparent electrode unit 41 and 42 constituting the touch sensor layer 40 may range from about 35 nm to about 150 nm, and an elongation of the transparent electrode unit 41 and 42 constituting the touch sensor layer 40 after the annealing operation (S30) may range from about 1.6% to about 7.0%.

Due to the above-described configuration, durability and optical characteristics of the touch sensor can be enhanced simultaneously. When the thickness D of the transparent electrode unit 41 and 42 is less than about 35 nm, the durability of the touch sensor is degraded such that when the touch sensor is bent, cracks may occur. When the thickness D of the transparent electrode unit 41 and 42 exceeds about 150 nm, although the durability of the touch sensor is increased, optical characteristics including a light transmittance are degraded. Further, when the elongation of the transparent electrode unit 41 and 42 constituting the touch sensor layer 40 after the annealing operation (S30) is less than about 1.6%, flexibility of the touch sensor is degraded such that a risk of cracks may exist. When the elongation exceeds about 7.0%, structural stability of the touch sensor may be reduced.

For example, to enable appropriate shrinkage, the annealing operation (S30) may be performed in a temperature range of about 70° C. to about 170° C. and for a duration of about 5 minutes to about 60 minutes. When an annealing temperature is below about 70° C., a desired shrinkage rate cannot be obtained. When the annealing temperature exceeds about 170° C., the touch sensor layer 40 and the protective films 92 and 94 formed on the base film 80 may melt. Further, when an annealing time is less than about 5 minutes, a desired shrinkage rate cannot be obtained. When the annealing time exceeds about 60 minutes, a shrinkage rate may be excessive, or components of the touch sensor may become structurally deformed.

Hereinafter, a touch sensor having enhanced durability and optical characteristics according to an exemplary embodiment of the present invention will be described with reference to FIG. 12, which illustrates a resultant structure obtained by a method of manufacturing a touch sensor. In the following description, it should be noted that the description and drawings of the method of manufacturing the touch sensor may be applied to the description of the touch sensor itself.

Figure 12:
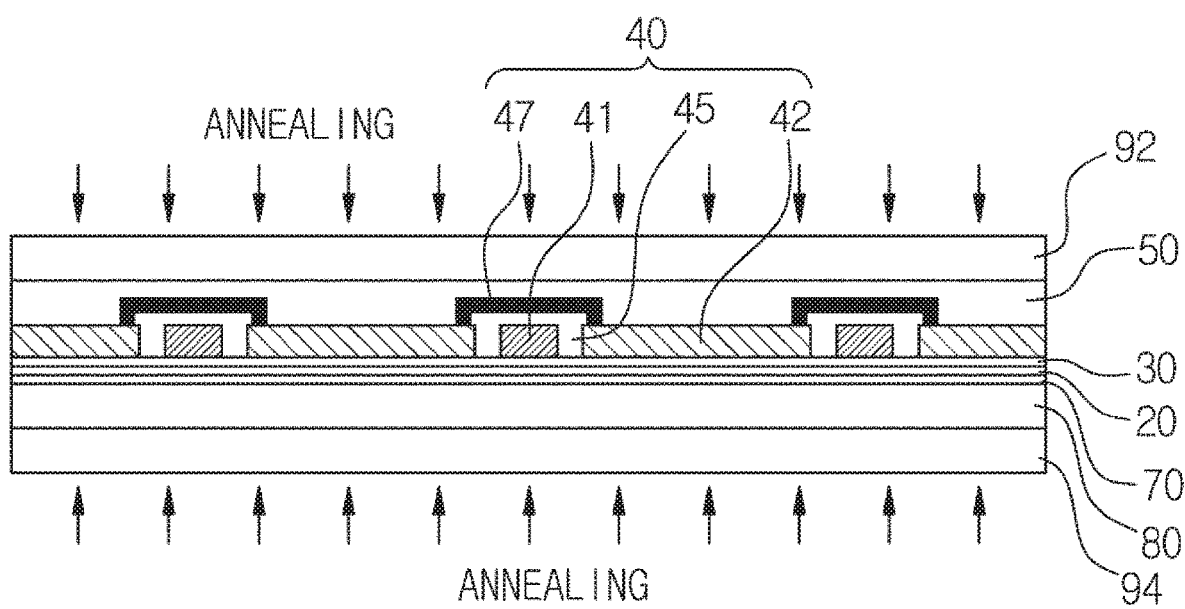

Referring to FIG. 12, the touch sensor having the enhanced durability and optical characteristics according to the exemplary embodiment of the present invention includes a base film 80, a separation layer 20, a first protective layer 30, a touch sensor layer 40, and a second protective layer 50.

The base film 80 functions as a structural base of the touch sensor.

For example, the base film 80 may be a transparent optical film, and the transparent optical film may use a film having transparency, mechanical strength, and good thermal stability, and more preferably, may use a heat-resistant material that is either not deformed or deformed less in the annealing operation (S30). Materials in the examples in the description of the method of manufacturing the touch sensor may be used.

The separation layer 20 is a functional layer formed to peel the touch sensor formed on the carrier substrate 10 from the carrier substrate 10 during the process of manufacturing the touch sensor.

For example, a material of the separation layer 20 is not specifically limited when the separation layer 20 meets conditions for providing predetermined levels of peel force and transparency, and materials in the examples in the description of the method of manufacturing the touch sensor may be used.

Although the peel force of the separation layer 20 is not specifically limited, the peel force of the separation layer 20 may be, for example, in a range of about 0.001 mm to about 1N/25 mm, and preferably, in a range of about 0.005 mm to about 0.2N/25 mm. When the range is satisfied, during the process of manufacturing the touch sensor, the separation layer 20 may be easily peeled from the carrier substrate 10 without residue, and curls and cracks caused by tension generated during the peeling may be reduced.

Although a thickness of the separation layer 20 is not specifically limited, for example, the thickness of the separation layer 20 may be in a range of about 10 nm to about 1000 nm, and preferably, in a range of about 50 nm to about 500 nm. When the range is satisfied, peel force may be stabilized, and a uniform pattern may be formed.

The first protective layer 30 protects the touch sensor layer 40 and functions to prevent the separation layer 20 from being exposed to an etchant for forming the touch sensor layer 40 in the touch sensor layer forming operation. The first protective layer 30 is an optional component that may be omitted as needed.

With respect to a material of the first protective layer 30, a polymer known in the art may be used without limitation, and materials in the examples in the description of the method of manufacturing the touch sensor may be used.

The touch sensor layer 40 is a component for sensing a touch signal input by a user.

As described above in the description of the method of manufacturing the touch sensor, due to the annealing of the touch sensor, the transparent electrode unit 41 and 42 constituting the touch sensor layer 40 will have shrunken to a specific level in advance to increase elongation. Accordingly, even when external force is applied to the touch sensor during a subsequent process for the touch sensor or in an environment in which the touch sensor is used, the transparent electrode unit 41 and 42 constituting the touch sensor layer 40 remains flexible due to the increased elongation. Thus, the transparent electrode unit 41 and 42 constituting the touch sensor layer 40 has an improved durability of crack in response to the external force.

For example, a thickness D of the transparent electrode unit 41 and 42 constituting the touch sensor layer 40 may range from about 35 nm to about 150 nm, and an elongation of the transparent electrode unit 41 and 42 constituting the touch sensor layer 40 after the annealing operation (S30) may range from about 1.6% to about 7.0%.

Due to the above-described configuration, durability and optical characteristics of the touch sensor can be enhanced simultaneously. When the thickness D of the transparent electrode unit 41 and 42 is less than about 35 nm, the durability of the touch sensor is degraded such that when the touch sensor is bent, cracks may occur. When the thickness D of the transparent electrode unit 41 and 42 exceeds about 150 nm, although the durability of the touch sensor is increased, optical characteristics including a light transmittance are degraded. Further, when the elongation of the transparent electrode unit 41 and 42 constituting the touch sensor layer 40 after the annealing operation (S30) is less than about 1.6%, flexibility of the touch sensor is degraded such that a risk of cracking may exist. When the elongation exceeds about 7.0%, structural stability of the touch sensor may be reduced.

For example, the sensing patterns constituting the touch sensor layer 40 may be formed in an appropriate shape according to the requirements of an electronic device to which the touch sensor is applied. For example, when the touch sensor is used in a touch screen panel, the sensing patterns may be formed as two types of patterns, that is, a pattern configured to sense an x coordinate and a pattern configured to sense a y coordinate, but are not limited thereto.

With respect to materials of the first sensing patterns 41, the second sensing patterns 42, and the connection patterns 47, any transparent conductive material may be used without limitation. For example, the materials may be selected from among: metal oxides selected from the group including ITO, IZO, IZTO, AZO, GZO, FTO, ITO-Ag-ITO, IZO-Ag-IZO, IZTO-Ag-IZTO, and AZO-Ag-AZO; metals selected from the group including gold (Au), silver (Ag), copper (Cu), molybdenum (Mo), and APC; nano wires made of a metal selected from the group including gold, silver, copper, and lead; carbon based materials selected from the group including CNT and graphene; and conductive polymer materials selected from the group including PEDOT and PANI, and the materials may be used individually or in a mixture of two or more thereof, and preferably, ITO may be used. Both a crystalline and a non-crystalline ITO may be used.

The transparent electrode unit 41 and 42 constituting the touch sensor layer 40, that is, the first sensing patterns 41 and the second sensing patterns 42, may be configured to have a thickness of about 35 nm to about 150 nm. Due to this configuration, a touch sensor that is a final resultant structure of the manufacturing process can obtain durability and simultaneously maintain optimum optical characteristics.

For example, the first sensing patterns 41 and the second sensing patterns 42 constituting the touch sensor layer 40 may be polygonal patterns that are independent of one another, for example, triangular patterns, tetragonal patterns, pentagonal patterns, hexagonal patterns, heptagonal patterns, or patterns of shapes with even more angles.

In addition, for example, the touch sensor layer 40 may include regular patterns. The regular patterns refer to patterns having a shape with regularity. For example, the sensing patterns may include rectangular or square mesh-shaped patterns or hexagonal patterns, which are independent of one another. By configuring the sensing patterns of the touch sensor layer 40 in a mesh shape, degradation of visibility caused by the sensing patterns may be prevented.

Furthermore, for example, the touch sensor layer 40 may include irregular patterns. The irregular patterns refer to patterns having an irregular shape.

In addition, for example, when the sensing patterns constituting the touch sensor layer 40 is formed of a material such as metal nanowires, carbon-based materials, or polymer materials, the sensing patterns may have a network structure. When the sensing patterns have the network structure, since a signal is sequentially transmitted to adjacent patterns contacting one another, patterns having a high sensitivity may be formed.

For example, the sensing patterns constituting the touch sensor layer 40 may be formed to have a mono-layered structure or a multilayered structure.

With respect to a material of the insulating layer 45 configured to electrically insulate the first sensing patterns 41 from the second sensing patterns 42, any insulating material known in the art may be used without limitation. For example, metal oxides like silicon oxides, photosensitive resin composites containing acrylic resins, or thermoplastic resin composites may be used. Alternatively, the insulating layer 45 may be formed using an inorganic material such as silicon oxide (SiOx). In this case, the insulating layer 45 may be formed using a method such as a deposition process or a sputtering process.

The second protective layer 50 functions to electrically insulate the touch sensor layer 40 from the outside and protect the touch sensor layer 40.

For example, the second protective layer 50 may be formed of an insulating material, and a side opposite a surface of the second protective layer 50 in contact with the touch sensor layer 40 may be planarized.

Further, for example, the second protective layer 50 may be formed to have a mono-layered structure or a multilayered structure including at least two layers.

For example, with respect to a material of the second protective layer 50, an insulating material known in the art may be used without limitation, and materials in the examples in the description of the method of manufacturing the touch sensor may be used.

As described above in detail, according to the present invention, there is an effect of a touch sensor and a method of manufacturing the same capable of simultaneously enhancing durability and optical characteristics of the touch sensor being provided.

In addition, by optimizing a thickness and annealing conditions of a transparent electrode unit that affects the durability and optical characteristics of the touch sensor, there is an advantageous effect of a touch sensor and a method of manufacturing the same capable of simultaneously enhancing flexibility and durability of the touch sensor while minimizing degradation of optical characteristics of the touch sensor being provided.

DESCRIPTION OF SYMBOLS

10: carrier substrate
20: separation layer
30: first protective layer
40: touch sensor layer
41, 42: transparent electrode unit
41: first sensing patterns
42: second sensing patterns
45: insulating layer
47: connection patterns
50: second protective layer
70: adhesive layer
80: base film
92, 94: protective film
S10: initial touch sensor manufacturing operation
S20: touch sensor supply operation
S30: annealing operation

The invention claimed is:

1. A touch sensor having enhanced durability and optical characteristics, comprising a transparent electrode unit constituting a touch sensor layer, which has an elongation of about 1.6% to about 7.0% and a base film having the thickness in a range of about 5 µm to about 200 µm formed on the touch sensor layer
    wherein the transparent electrode unit constituting the touch sensor layer includes a first sensing pattern and a second sensing pattern,
    wherein the first sensing pattern and the second sensing pattern include polygonal patterns that are independent of one another;
    a separation layer formed between the base film and the touch sensor layer;
    a first protective layer formed between the separation layer and the touch sensor layer; and
    a second protective layer formed on a surface opposite a surface of the touch sensor layers on which, from among both surfaces of the touch sensor layer, the base film is formed.

2. The touch sensor according to claim 1, wherein a thickness of the transparent electrode unit constituting the touch sensor layer ranges from about 35 nm to about 150 nm.

3. The touch sensor according to claim 1, wherein the transparent electrode unit comprises indium tin oxide (ITO).

* * * * *